J. E. HOUGHLAND.
COMBINED PULVERIZER AND PLANTER.
APPLICATION FILED JULY 9, 1908.
928,452.
Patented July 20, 1909.
2 SHEETS—SHEET 1.
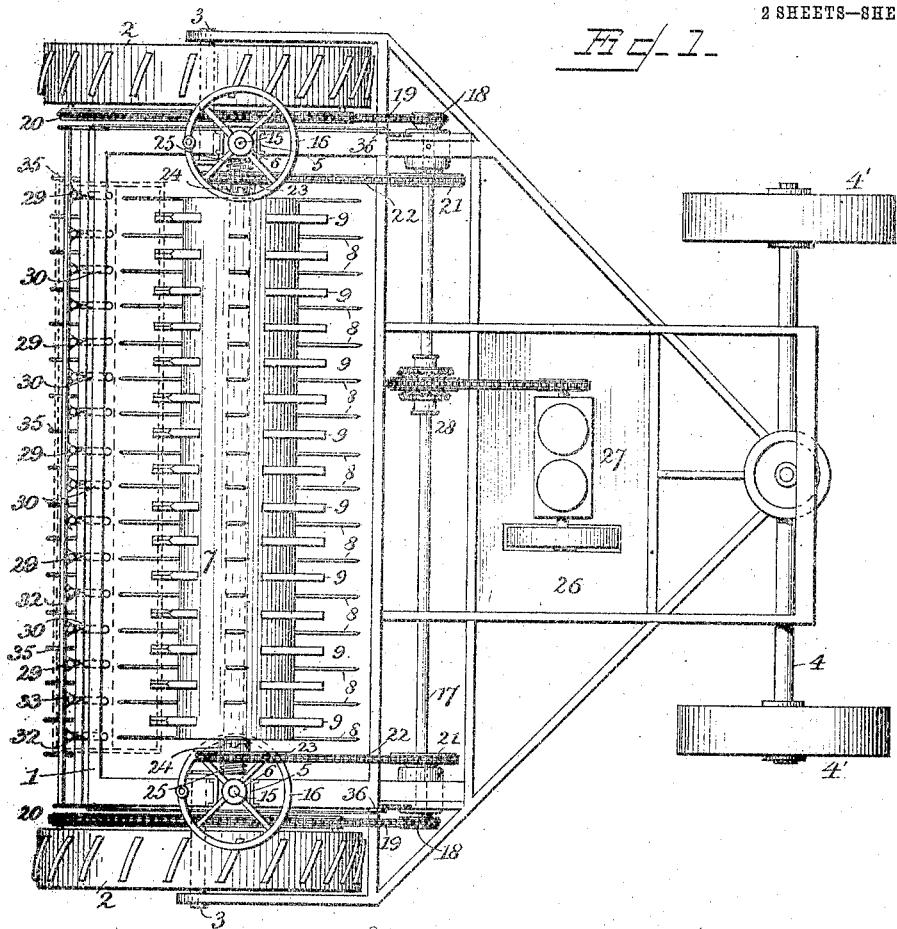
Witnesses
F. L. Durand
C. H. Giesbarier
Inventor
James E. Houghland
By H. B. Willson & Co.
Attorneys

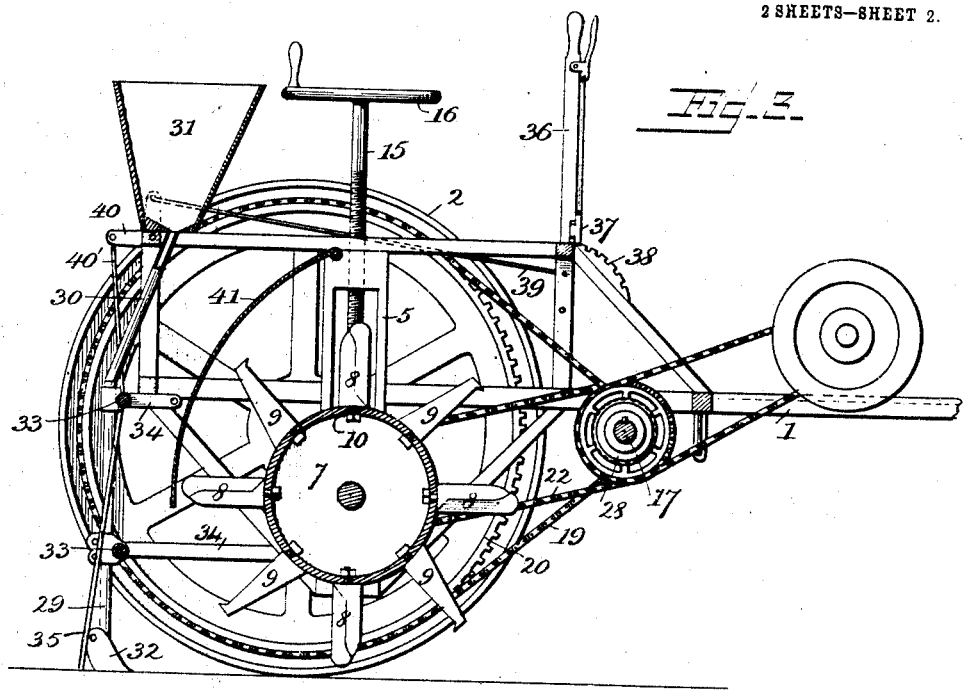

UNITED STATES PATENT OFFICE.

JAMES E. HOUGHLAND, OF ELDON, IOWA.

COMBINED PULVERIZER AND PLANTER.

No. 928,452.

Specification of Letters Patent.

Patented July 20, 1909.

Application filed July 9, 1908. Serial No. 442,708.

*To all whom it may concern:*

Be it known that I, JAMES E. HOUGHLAND, a citizen of the United States, residing at Eldon, in the county of Wapello and State of Iowa, have invented certain new and useful Improvements in a Combined Pulverizer and Planter; and I do declare the following to be a full, clear, and exact description of the invention, such as will enable others skilled in the art to which it appertains to make and use the same.

This invention relates to a combined pulverizer and planter.

The object of the invention is to provide a machine of this character having means whereby the soil is thoroughly worked up and pulverized, seeded and the seeds harrowed in all in one operation or going over the field.

With this and other objects in view, the invention consists of certain novel features of construction, combination and arrangement of parts as will be described and particularly pointed out in the appended claims.

In the accompanying drawings, Figure 1 is a plan view of the machine arranged for pulverizing and planting purposes, seed hopper being omitted to show the parts beneath the same; Fig. 2 is a side view with the near supporting wheel removed; Fig. 3 is a longitudinal sectional view of the same.

Referring more particularly to the drawings, 1 denotes the main supporting frame, in the opposite sides of the rear portion of which are arranged supporting wheels, 2, which are mounted upon stub shafts, 3, the inner ends of which are secured in suitable blocks secured to the frame, while the outer ends are secured in side extensions of the supporting frame. The forward end of the frame 1 is supported upon a front axle, 4, which is pivotally connected thereto in any suitable manner and has mounted on its ends steering wheels, 4'.

On the side bars of the machine in the central part of the rear portion of the frame are mounted vertically disposed guide standards, 5, in which are adjustably mounted bearing boxes, 6, in which are journaled the ends of a pulverizing cylinder, 7, which extends across the machine within the rear portion of the frame. The cylinder 7 is provided with cutting blades or knives, 8, and digging forks, 9, said blades and forks being arranged in alternate rows across the cylinder to which they are detachably secured in any suitable manner, the same being here shown as provided with reduced threaded shanks, 10, adapted to be inserted through apertures in the sides of the cylinder and having on their inner ends clamping nuts which are screwed onto said shanks and into engagement with the inner walls of the cylinder, as shown. The bearing boxes, 6, are slidably engaged with the side bars of the standards, 5, and are loosely connected by bolts, 12, to an adjusting plate, 13, between which and said boxes are arranged coiled springs, 14, which form cushions to permit the pulverizing cylinder to yield or move upwardly when the cutting blades or forks thereon come into engagement with an obstruction. To the plates, 13, are connected the lower ends of adjusting screws, 15, which have a threaded engagement with the upper ends of the standards, 5, and are provided on their upper ends with operating wheels, 16, whereby when the screws are turned in one direction or the other, the bearing boxes 6 and the pulverizing cylinder may be moved up or down to cause the blades and forks thereon to more or less deeply cut into the earth, or by means of which the cylinder may be raised to such an extent that the forks and blades thereon will be entirely disengaged from the ground, as when the machine is being moved from one field to another.

In the forward portion of the supporting frame is mounted an operating shaft, 17, the ends of which are journaled in suitable bearings, as shown. On the extreme outer ends of the shaft, 17, are fixed driving sprockets, 18, which are connected by sprocket chains, 19, to large sprocket wheels, 20, which are suitably connected to the supporting wheels, 2, to turn the same and thereby propel the machine. On the operating shaft, 17, are also mounted sprocket wheels, 21, which are connected by sprocket chains, 22, to sprocket gears 23, which are loosely mounted on the ends of the cylinder shaft and have a clutch connection, 24, with the opposite ends of the cylinder whereby the latter is driven when the machine is propelled in the forward direction. The clutch members on the gears 23 are held in operative engagement with the clutch members on the ends of the cylinder by means of coiled springs, 25. The clutch connection between the cylinder and its operating gears is provided to facilitate the operation of the same when the machine is making turns and to prevent the retrograde movement of the cylinder when the machine is backed.

On the forward portion of the frame is arranged a platform, 26, adapted to support a suitable motor for operating and propelling the machine, said motor being here shown and is preferably in the form of a gasolene engine, 27, the shaft of which is connected by a sprocket chain or other suitable connection to a differential gear, 28, on the operating shaft, 17.

Hingedly connected to the rear portion of the supporting frame 1 is a series of drill tubes, 29, the upper ends of which are connected by feed tubes, 30, to a suitable hopper, 31, arranged on the rear end of the machine as shown. On the lower ends of the drill tubes are arranged suitable furrow-opening shoes, 32. The drill tubes are secured to a suitable frame having upper and lower cross bars, 33, the ends of which are pivotally connected to rearwardly projecting supporting links, 34, the inner ends of which have their pivotal connection with the rear portion of the main supporting frame, as shown. To the upper cross bar, 33, and in alternating relation with the drill tubes is secured a series of harrow teeth, 35, which serve to cover and work the seed into the ground. By pivotally connecting the drill tubes and harrow teeth to the supporting frame as hereinbefore described, said tubes and harrow teeth may be raised out of engagement with the ground. In order that the drill tubes and harrow teeth may be raised when desired, I provide hand levers, 36, which are pivotally connected at their lower ends to the supporting frame, and said levers are provided with pawls, 37, adapted to engage suitable racks, 38, whereby the levers are held in adjusted positions. The lower ends of the levers, 36, are connected by suitable connecting rods, 39, to one arm of bell crank levers, 40, on the rear portion of the frame, said bell crank levers having their opposite arms connected by links, 40', to the upper cross bars, 33, which connect the drill tubes. By this arrangement the drill tubes and harrow teeth may be readily raised or lowered and secured at the desired elevation.

By the arrangement of the cutting blades and digging forks on the pulverizing cylinder, the ground over which the machine passes will be thoroughly cut and broken up and placed in condition to receive the seeds which are discharged through the seed tubes from the hopper, after which the seeds are covered by the harrow teeth, thus preparing and seeding the ground in one operation or in one going over the field. In the rear portion of the supporting frame is arranged a curved shield plate, 41, which prevents the dirt being thrown back by the cutting blades and forks of the cylinder. When it is desired to sow the seeds broadcast, the drill tubes are detached from the rear end of the machine and the seeds thus permitted to drop directly from the hopper.

From the foregoing description, taken in connection with the accompanying drawing, the construction and operation of the invention will be readily understood without requiring a more extended explanation.

Various changes in the form, proportion and the minor details of construction may be resorted to without departing from the principle or sacrificing any of the advantages of the invention as defined in the appended claims.

Having thus described my invention, what I claim as new and desire to secure by Letters-Patent, is:

1. In a machine of the character described, a main supporting frame, a pulverizing cylinder revolubly mounted in said frame, a shield plate arranged over said pulverizing cylinder, a seeding mechanism, said mechanism comprising a frame, horizontal connecting links pivotally connecting said frame with the rear portion of the main supporting frame, a series of drill tubes arranged in said seeding attachment, a series of harrow teeth carried by said attachment in alternating relation with the drill tubes, means under the control of the operator to raise and lower said drill tubes and harrow teeth, a seed hopper over the upper ends of the drill tubes, and means to operate said pulverizing cylinder, substantially as described.

2. In a machine of the class described, a supporting frame, a drill supporting frame mounted for vertical adjustment at the rear end of the main supporting frame, vertical drill tubes connected with the drill supporting frame, a hopper mounted upon the main supporting frame, feed tubes leading from the upper ends of the drill tubes into the hopper, furrow opening shoes at the lower ends of the drill tubes, rearwardly inclined harrow teeth attached to the second named frame in alternating relation with the drill tubes, and means under the control of the operator for adjusting the drill tube supporting frame vertically.

3. In a machine of the class described, a main supporting frame, a second frame consisting of upper and lower bars pivotedly mounted at the rear end of the main supporting frame, drill tubes and harrow teeth attached to the pivoted frame, and means under the control of the operator for raising both ends of the pivoted frame, said means comprising operating levers pivoted to opposite sides of the supporting frames, bell crank levers pivoted to the rear corners of the supporting frame, connecting rods between the vertical arms of the bell crank levers and the operating levers, and vertically disposed links between the horizontal arms of the bell crank levers and the upper cross piece of the pivoted frame.

In testimony whereof I have hereunto set my hand in presence of two subscribing witnesses.

JAMES E. HOUGHLAND.

Witnesses:
 ADELBERT CHRISTY,
 WILLIAM NOWVIOCK.